July 26, 1927.
A. M. NICHOLS
PRESSURE REGULATOR
Filed Jan. 4, 1926
1,637,085
2 Sheets-Sheet 1
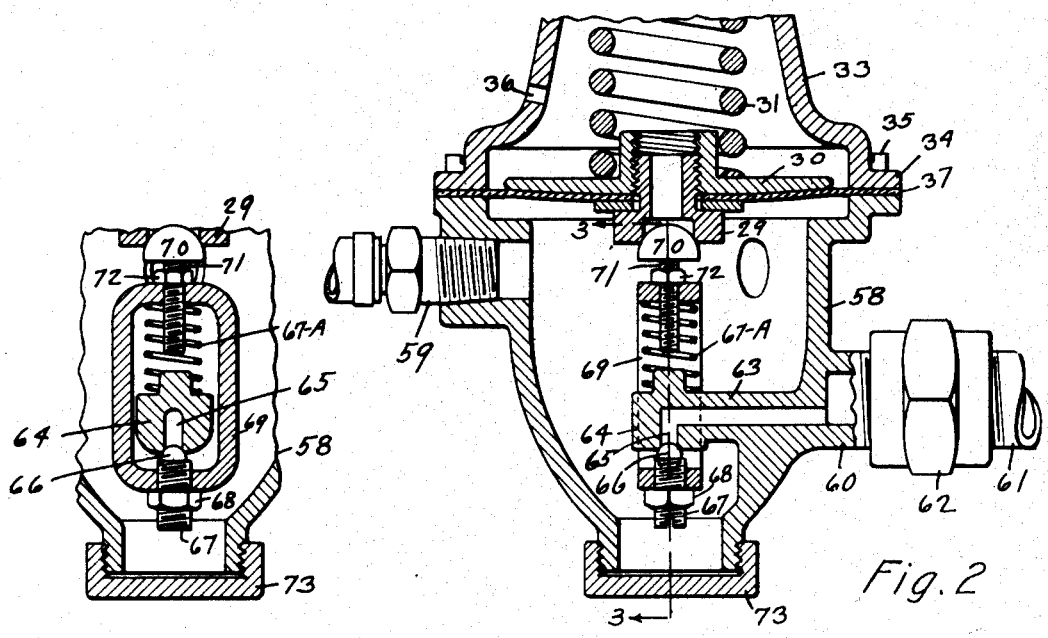
Fig. 3
Fig. 2
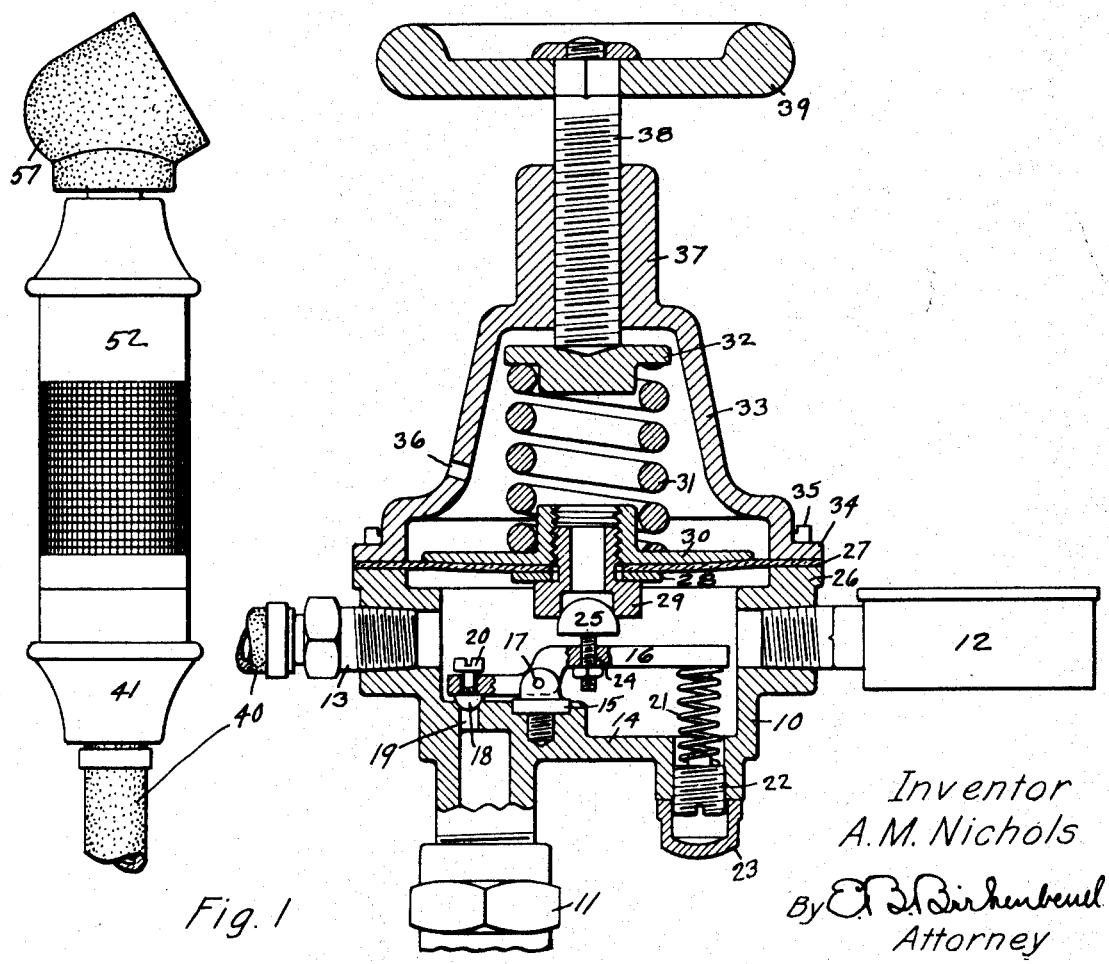
Fig. 1
Inventor
A. M. Nichols
By E. B. Birkenbeuel
Attorney July 26, 1927.

A. M. NICHOLS

PRESSURE REGULATOR

Filed Jan. 4, 1926

1,637,085

2 Sheets-Sheet 2

Inventor
A. M. Nichols
By E. F. Birkenbeul.
Attorney

Patented July 26, 1927.

1,637,085

UNITED STATES PATENT OFFICE.

ARTHUR M. NICHOLS, OF TIGARD, OREGON.

PRESSURE REGULATOR.

Application filed January 4, 1926. Serial No. 79,083.

This invention relates generally to the automotive industry, and particularly to a special form of pressure regulator for controlling the degree of inflation of pneumatic tires.

The first object of this invention is to provide an exceedingly simple and efficient regulating mechanism for air supply lines which will accurately control the pressure of air delivered from said line.

The second object is to so construct the parts that there will be no wire drawing of the valves or chattering of the parts during operation.

The third object is to so dispose the parts that pressures may be regulated between extremely close limits and also that the valve parts may be easily held in their correct relation.

The fourth object is to so construct the device that a large flow of air can be delivered to the tire until it is fully inflated.

Figure 4:
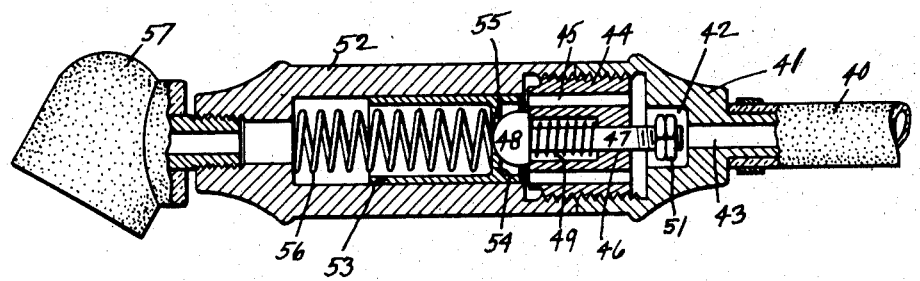
Figure 7:
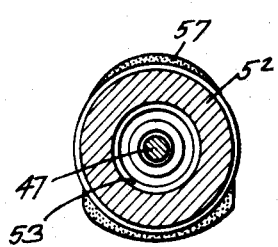
Figure 5:
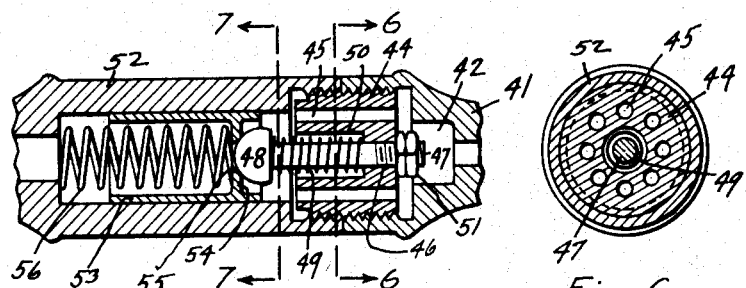
Figure 6:
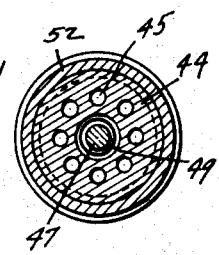
Figure 8:
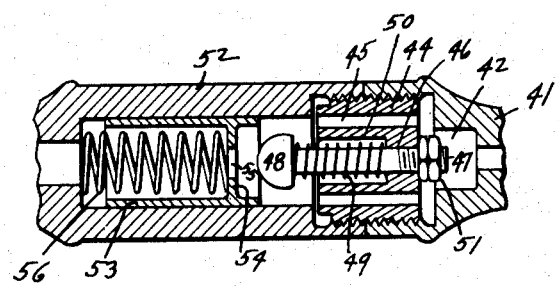
Figure 9:
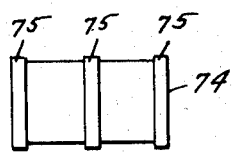

These, and other objects, will become more apparent from the specification following as illustrated in the accompanying drawing, in which:

Figure 1 is a longitudinal section through the pressure regulating unit showing the vibrating unit in elevation and with the connecting hose broken away. Figure 2 is a longitudinal section through a modified form of pressure regulating unit. Figure 3 is a transverse section taken along the line 3—3 in Figure 2. Figure 4 is a longitudinal section through the vibrator unit showing the parts in a rest position. Figure 5 is a fragmentary longitudinal section similar to Figure 4 but showing the parts in mid-position. Figure 6 is a transverse section taken along the line 6—6 in Figure 5. Figure 7 is a transverse section taken along the line 7—7 in Figure 5. Figure 8 is a longitudinal section similar to Figure 5 but showing the parts farthest from the rest position. Figure 9 is a side elevation of a modified form of piston which can be employed in the vibrator mechanism.

Similar numbers of reference refer to the same parts throughout the several views.

Regulating unit.

Referring in detail to the drawings, the regulating unit includes a body 10 adapted to be connected with an air line by means of a union 11. A gage 12 is mounted on one side of the body 10 which is also provided with an outlet nipple 13. On the bottom 14 of the body 10 is mounted a stud 15 which serves as a standard for the lever 16 which is pivotally mounted on the pin 17.

At one end of the lever 16 is attached a plug 18 which can seat in the opening 19 in in the bottom 14 and connects with the air line. The screw 20 fits loosely in the lever 16 in order that the plug 18 may find a proper seat in the opening 19. Under the opposite end of the lever 16 is placed a spring 21 whose tension may be accurately adjusted by means of a screw 22 which is provided with a cap 23. Between the spring 21 and the pin 17 and threaded into the lever 16 is the shank 24 of the half ball 25.

On the flanged rim 26 of the body 10 is placed a diaphragm 27 provided on the under side of its center with a washer 28 through which passes a bushing 29 in whose lower end is seated the ball 25. Above the diaphragm 27 and threaded on to the bushing 29 is a flanged collar 30 over which is placed a heavy spring 31 provided at its upper end with a cap 32.

Over the parts just described is placed a housing 33 whose flange 34 is secured to the flange 26 by means of the screws 35. An air vent 36 is provided in the housing 33. Threaded into the neck 37 of the housing 33 is a screw 38 provided with a hand wheel 39.

Vibrator unit.

Attached to the nipple 13 is a hose 40 provided at its outer end with a vibrator and air chuck. The vibrator shank 41 is fastened to the hose 40 in any convenient manner and is provided with a somewhat enlarged recess 42 to which air gains access through the opening 43. Threaded into the shank 41 is a plug 44 provided with longitudinal holes 45 disposed around the axis thereof and a central opening 46 in which is slidably placed the stem 47 of the ball 48. A spring 49 on the stem 47 occupies a recess 50 in the member 44. Nuts 51 are provided on the end of the stem 47.

Threaded on to the projecting end of the plug 44 is the vibrator cylinder 52 in which is fitted a light, close-fitting, tubular piston 53 in whose head 54 is formed an opening 55 in which the ball 48 can seat. A spring 56 in the cylinder 52 urges the piston 53 toward the ball 48. An air chuck 57 is threaded into the discharge end of the cylinder 52.

The operation of this form of the device is as follows: If it is desired to deliver air at a pressure of, say, forty pounds, to a tire the operator is required to turn the hand wheel 39 until the gage 12 reads forty pounds, which will make it possible to deliver air to a tire until the pressure of forty pounds is attained.

It will be noted that thus far there have been described two units of the device which are joined together by means of a rubber hose. The function of the regulating unit is to reduce the pressure to be delivered to a desired degree, and the function of the vibrator is to maintain a suitable rate of inflation until the required amount is attained, instead of gradually reducing the rate, as is ordinarily the case when no vibrator or equivalent thereof is employed.

In order to give a clearer understanding of this device, the functioning of the vibrator will first be explained. Assuming that the spring 56 is capable of resisting a pressure of twenty pounds in the hose 40, it is evident that in order to secure a pressure of forty pounds in the tire that the total of these two pressures, or sixty pounds, must be available in the air hose 40. Assuming this to be the case it will be observed, in Figure 4, that it is possible for air from the hose 40 to pass through the holes 45 and exert pressure against the piston 53. A small amount of pressure is also exerted against the end of the stem 47 which, together with the spring 49, causes the ball 48 to remain seated in the opening 55 until the nuts 51 come in contact with the end of the plug 44. This means that the ball 48 will stop and the slight continued movement of the piston 53 will tend to unseat the ball 48 and permit air to pass through the cylinder 52 to the chuck 57, which makes it available for the inflation of a tire.

If the chuck 57 engages the valve stem and the air passes therethrough it is evident that the spring 56 will now return the piston 53 to its seat, and also return the stem 47 to its original position, as shown in Figure 4, after which the cycle of operations just described will be repeated with a high degree of rapidity, thereby admitting air to the tire in a pulsating flow until a sufficient back pressure is developed on the spring side of the piston 53 to resist the further passage of air.

It will be evident from this that the pressure indicated on the gage is not the actual pressure maintained within the device, but is the actual pressure to which a tire can be inflated.

In order to maintain this regulated pressure the regulating device operates as follows. The spring 21 is adjusted to a state of balance which controls the limits of pressure which can be maintained within the body 10, and by so doing makes it possible to regulate this pressure within extremely narrow limits.

Assuming that air is admitted through the opening 19 to the inside of the body 10 and it is desired to attain a given pressure on the gage 12, the operator in turning the hand wheel 39 increases or decreases the tension on the spring 31 until the pressure within the body is sufficient to raise the bushing 29 and therefore permit the spring 21 to raise the ball 25 and cut off the further admission of air from the air line.

Should the plug 18 leak or should it be desirable to set the gage for a lower pressure after a higher pressure has been employed, it is evident that the reduced pressure on the spring 31 will not be sufficient to hold the bushing 29 against the ball 25, thereby permitting the excess pressure which exists in the body, hose and vibrator to waste away through the bushing 29 and the vent 36.

Turning now to Figures 2 and 3 it will be observed that the general scheme of operation of this modified form is the same as that illustrated in Figure 1; in fact, all of the parts above the diaphragm 27 are exactly the same. The body 58, however, is provided with an outlet nipple 59 and an air inlet connection 60 which can be joined to the air line 61 by means of the union 62. The air inlet connection 60 is provided with an extension 63 having a downturned end 64 in whose opening 65 is seated a ball 66 which normally rests in an adjusting screw 67 which is locked by the nut 68 to the under side of the closed yoke 69 which is supported over the end 64 by means of a spring 67$^A$. In the upper end of the yoke 69 is mounted a half ball 70 which is adapted to seat in the bushing 29. The shank 71 of the ball 70 is threaded into the yoke 69 and is locked thereto by means of a nut 72. A cap 73 is placed over the lower end of the body 58 to facilitate the adjustment and replacement of the parts.

The operation of this form of the device is quite similar to that described for Figure 1, except that in this event the air passing through the inlet connection 60 tends to unseat the ball 66 and build up a pressure within the body 58 to a degree controlled entirely by the compression of the spring 67$^A$, which tension can be controlled easily by the screw 67 by means of which the inlet closing valve can be maintained in a close state of balance, whose exact moment of operation is controlled by the compression of the spring 31, as previously described.

In Figure 9 is illustrated a modified form of piston 74 having the raised rings 75 formed thereon which permits of a closer fit being possible and also of further lightening of the piston itself, which is very desirable, since the more weight employed in the piston the slower will be the vibration thereof.

I am aware that many forms of pressure regulating apparatus have been constructed in the past and herewith draw attention to my co-pending applications, Serial Number 61,005 and Serial Number 77,407, for similar devices over which the regulator described herein is an improvement; I therefore do not intend to cover such devices broadly, but I do intend to cover all such forms and modifications thereof as fall fairly within the appended claims.

I claim:

1. A vibrator having a cylinder; a spring-urged piston in said cylinder, said piston having an opening in the head thereof; a spring-urged plunger having a ball adapted to seat in said piston opening; a stop for said plunger adapted to permit said piston to move away from said plunger in a manner to unseat said ball during the last portion of the travel of said piston in a direction which will compress its spring.

2. The combination of a pressure reducing valve and a vibrating valve in series with said reducing valve having a pressure resisting element therein adapted to establish a differential between the reduced pressure and the delivered pressure.

3. In a pressure regulator, the combination of a governing mechanism including a body having an air inlet; a balanced plug for closing said inlet against pressure; means for adjusting the balance of said plug; a spring-loaded diaphragm adapted to unbalance said plug and raise same from its seat during under-pressures within said body and having an opening in said diaphragm for the wasting of over-pressures; a ball on said lever balanced for sealing said diaphragm opening; a vibrator unit supplied with controlled air from said regulator unit having a pressure-resisting mechanism therein adapted to open intermittently until the total of the back pressure from the object being inflated and the pressure resistance of said vibrator total the pressure within said body.

ARTHUR M. NICHOLS.